Sept. 29, 1953  E. B. THOMPSON  2,653,567
CONDUIT CONNECTION FOR MILKING MACHINES
Original Filed Dec. 6, 1945
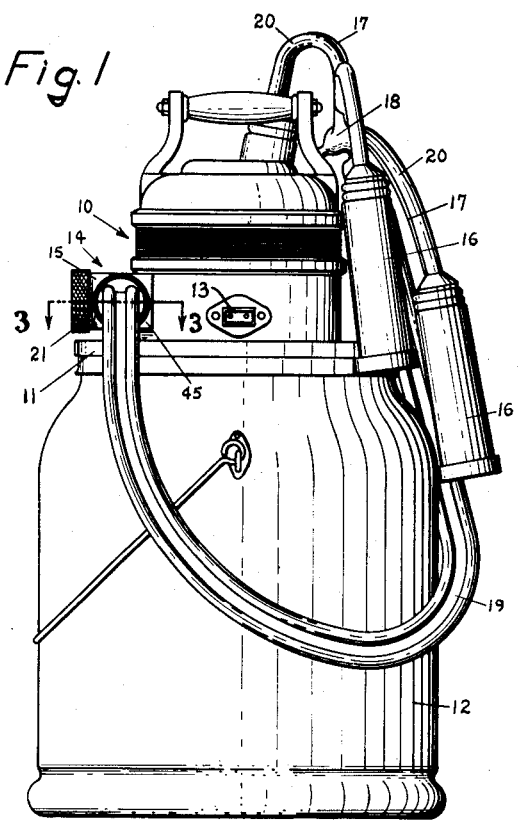
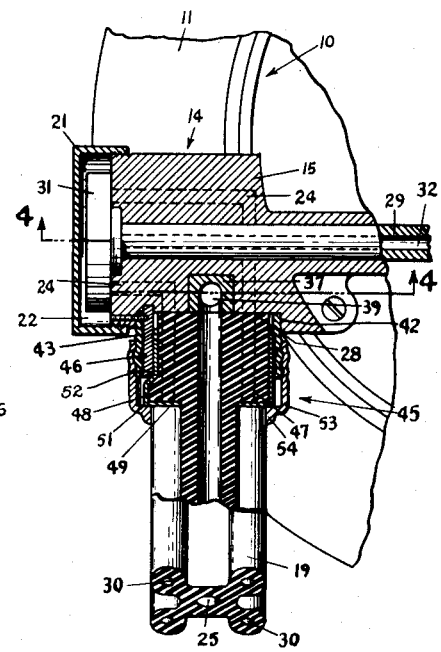
INVENTOR
Elmer B. Thompson
By Rudolph L. Lowell
  atty.

Patented Sept. 29, 1953

2,653,567

UNITED STATES PATENT OFFICE 2,653,567

CONDUIT CONNECTION FOR MILKING MACHINES

Elmer B. Thompson, Des Moines, Iowa, assignor, by mesne assignments, to Globe Hoist Company, Des Moines, Iowa, a corporation of Iowa Original application December 6, 1945, Serial No. 633,240. Divided and this application March 12, 1951, Serial No. 215,085

3 Claims. (Cl. 119—14.4)

This invention relates generally to milking machines and in particular to a coupling means for releasably securing a power unit in a mounted position on a milk receptacle cover concurrently with the connection of an air and milk carrying conduit with the power unit. This application is a division of application Serial #633,240, filed December 6, 1945, now Patent Number 2,548,073.

An object of this invention is to provide a coupling means for concurrently connecting together a power unit, with a milk and air carrying conduit and a cover for a milk receptacle so that these parts can be handled together during a milking operation, and then readily separated for cleaning and servicing purposes.

A feature of this invention is found in the provision of a milking machine having a power unit adapted to be supported on a cover for a milk receptacle, in which a coupling device for fluid connecting an air and milk conduit with air passages formed in the unit and with an upright milk passage carried on the receptacle cover, concurrently releasably connects the power unit and the upright milk passage so that the power unit and the cover are movable together relative to the milk receptacle.

Further objects, features and advantages of this invention will become apparent from the following description when taken in connection with accompanying drawing in which:

Fig. 1 is a side elevational view of a milking machine embodying the coupling device of this invention;

Fig. 2 is an enlarged elevational view of a portion of the power unit of the milking machine illustrated in Fig. 1, showing the assembly with an air distributing device therein of a portion of the coupling of this invention;

Fig. 3 is an enlarged sectional view taken along the lines 3—3 in Fig. 1; and

Fig. 4 is a sectional view taken on the line 4—4 in Fig. 3.

With reference to the drawing the coupling device of this invention is illustrated in Fig. 1 as applied to a milking machine of a mechanical type including a power unit, indicated generally as 10, mounted on a cover 11 for a milk receptacle 12. The power unit is a package assembly and comprises an electric motor (not shown) adapted to be connected with a suitable source of electrical supply through a plug-in connection 13. Located within the unit 10 and operated by the electric motor is a pump (not shown) and a device 14 for distributing air at different pressures to teat cups 16 of inflation type, which are connected through air and milk lines 17 and 20, respectively, with a claw member 18, which in turn is in fluid connection with the air distributing device 14 through a milk and air carrying conduit 19 comprised of a rubber or like material and integrally formed with a milk passage 25 and air passages 30. The conduit 19 is connected with the claw member 18 and the air distributing device 14 by a coupling device indicated generally as 45 in Figs. 1 and 3.

The air distributing device 14 (Figs. 3 and 4) projects laterally from the power unit 10 and includes a body member 15 having its outer end of a cylindrical shape and threaded for engagement with a cap member 21. A space 22, between the cap and the body member, constitutes a chamber which is connected with the pump in the power unit 10, through a suitable air connection including a passage-way 23, and is maintained by the pump at a sub-atmospheric pressure. Also maintained under sub-atmospheric pressure by the pump is the space within the milk receptacle 12.

Formed within the air distributing device 14 are four air passages 24, one for each teat cup 16, which passages terminate at one of their ends in openings arranged in a spaced relation in the end face 26 of the body member 15, which end face forms a side wall for the air chamber 22 and functions as a valve seat as will appear later. The opposite ends of the air passages 24 terminate in openings 27 formed in a surface portion 28 (Figs. 2 and 3) of the body member 15.

The air passages 24 are alternately opened in succession to the sub-atmospheric air chamber 22, and to an atmospheric air chamber (not shown) formed in the power unit 10, by means including a rotary valve having a stem 29 rotatably supported in the body member 15 and connected in a driven relation with the electric motor in the power unit 10 (Figs. 3 and 4). A valve head 31 on the stem 29 is located in the chamber 22 and has one side in seating engagement with the valve seat 26.

Extended axially of the stem 29 is an air passage 32 connected at one end with the atmospheric chamber in the power unit 10 and having its opposite end connected with an annular groove 33 formed in the side of the valve head 31 adjacent to the valve seat and adapted to be passed over the ends of the passages 24 located in the valve seat 26. An annular recess 34 extends through the valve head 31 to fluid communicate the passages 24 in succession with the air chamber 22 as the valve member is rotated.

The air distributing device 14 and power unit 10 are described in detail in Patent Number 2,427,312.

In the operation of the milking machine the groove 33 and the recess 34 are passed in succession over the end openings of the passages 24 in the valve seat 26, to alternately distribute air at sub-atmospheric pressure to the passages 24 and in turn to the teat cups 16, through the conduit 19, claw member 18 and air lines 17.

Milk from a teat cup 16 is carried through a milk line 20, the claw 18 and the milk passage 25 in the conduit 19 into a nipple or milk passage member 37, in the air distributing device 14, which member 37 is open to the space within the milk receptacle 12 (Figs. 3 and 4).

The nipple 37 extends through and is secured to the receptacle cover 11 in an upright position. When the power unit 10 is supported on the cover 11, the nipple 37 is loosely received in a cavity 38, formed in the body member 15 and open to the surface portion 28, so that the nipple 37 is flush with the surface 28. The upper end of the milk passage 39, in the nipple 37, terminates in an opening 41 located in the plane of the surface 28 and intermediate the openings 27 for the air passages 24. It is seen, therefore, that the air passages 24 and the milk passage 39 terminate in openings 27 and 41, respectively, located in a common surface 28 of the body member 15.

As shown in Fig. 3 the surface portion 28 of the body member 15 constitutes the bottom wall of a recess 42 formed in the member 15 and having its side wall internally threaded. Threadable within the recess 42 to a fixed position is a coupling member 43 of a tubular shape, having its free end externally threaded, and projected outwardly from the body member 15 so as to constitute an extension for the side wall of the recess 42. Extended axially of the fixed coupling member 43 and projected inwardly from its inner periphery is a guide or pin member 46.

The end of the conduit 19, to be connected with the air distributing device 14, is formed with an enlarged section 47 adapted to be loosely received within the fixed coupling member 43. Mounted in a fixed position about the conduit end section 47 is a tubular sleeve member 48 having one end spaced from the end of the conduit 19, and an opposite end provided with an inwardly extended annular flange 49 to form an annular shoulder 51 extended about the conduit 19. An axially extended depression 52, in the periphery of the sleeve member 48, is of a size to guidably receive the guide member 46 on the fixed coupling member 43.

A rotatable or movable coupling member 53, of a tubular construction, is loosely positioned in a spaced relation about the sleeve member 48 and has an inwardly extended annular flange 54 at one end which constitutes a shoulder for bearing engagement with the shoulder 51 on the sleeve member 48 to limit the movement of the coupling member 53 in one direction axially of the sleeve member 48. The other end of the movable coupling member 53 is threaded for threadable engagement with the external threads on the projected end of the fixed coupling member 43.

In the use of the coupling device 45 the axial depression 52 in the sleeve member 48 is initially aligned with the pin 46 on the fixed coupling member 43 and the conduit end section 47 is then inserted within the fixed coupling member 43. The alignment of the pin 46 within the depression 52 provides for the milk passage 25 and air passages 30 in the conduit 19 being in proper registration with the corresponding milk opening 41 and air openings 27 in the surface portion 28, with the pin 46 and the depression 52 constituting a cooperative guide means for accomplishing this registration.

As the coupling members 43 and 53 are coupled together, by rotation of the coupling member 53, the shoulder 54 is moved into bearing engagement with the shoulder 51 whereby the end face of the conduit section 47 is pressed or clamped in a fluid sealing engagement against the surface portion 28.

As previously mentioned the nipple 37 is loosely received in the cavity 38 formed in the body member 15 at the surface portion 28, so that the power unit 10 is separable from the receptacle cover 11. However, on completion of the connection of the conduit 19 with the air distributing device 14, the nipple 37 is clamped between the end face of the conduit section 47 and the bottom wall of the cavity 38. Due to this clamping action the nipple 37 is frictionally held within the air distributing device so that the cover 11 is attached to the power unit 10 for movement therewith relative to the milk receptacle 12.

On the release of the coupling device 45, the nipple 37 is concurrently released from its clamped position between the conduit 19 and the air distributing device 14 whereby the cover 11 and the power unit 10 are separable for cleaning or servicing purposes. The assembly of the nipple unit 37 relative to the air distributing device 14 and the coupling 45 thus provides a coupling means for releasably locking the power unit 10 with the cover 11 for movement together.

As shown in Fig. 4 a gasket 56, of a rubber material, is secured to the under side of the power unit 10 and is provided with an opening for receiving the lower end of the nipple unit 37. The gasket 56 is of a ring shape and is interposed between the power unit 10 and the cover 11 for sealing purposes, when the power unit is supported on the cover. Since the gasket 56 may undergo variations in thickness due to wear or conditions of use, the opening 41 in the nipple (Fig. 2) is of an elongated shape to accommodate such variations and to assure at all times a proper registration of the opening 41 with the milk passage 25 in the conduit 19.

From a consideration of the above description it is seen that the coupling device of this invention concurrently connects the power unit 10, the receptacle cover 11 and conduit 19 on completion of the coupling connection between the conduit 19 and the air distributing device 14. Thus when the milking machine is in use, the power unit, conduit 19, claw member 18, and teat cups 16 are all movable together, independently of the receptacle container 12, so as to facilitate the handling of the machine for successive milking operations. Further, on release of the coupling connection 45 all of these parts are immediately separable so as to simplify the cleaning and washing of the machine after milking is completed.

Although the invention has been described with respect to a preferred form, thereof, it is to be understood that it is not to be so limited since changes can be made therein which are within the full intended scope of this invention as defined by the appended claims.

I claim:

1. For use with a milking machine apparatus including a power unit, a milk receptacle, and a cover for said receptacle for supporting said power unit, the combination of an upright milk passage means having an opening in an upright face thereof and secured to said cover, an upright surface portion on said power unit having an upwardly extended cavity therein to loosely receive said milk passage means, such that when the power unit is in a supported and operative position on said cover said opening in said upright passage means is in the plane of said surface portion, a flexible conduit having a milk passage therein for connection to said milk passage means, and means engageable with said conduit for releasably clamping an end face of said conduit in a fluid sealed engagement against said surface portion and said upright passage means, with said clamping action providing for said milk passage means being clamped between said conduit end face and the side wall of said cavity whereby said cover and power unit are releasably secured for movement together.

2. A milking machine apparatus comprising a unit supported on a cover for a milk receptacle, an upright member secured to said cover and having an upwardly extended milk passage therein, said upright member having an opening in one side thereof communicating with said milk passage, an upright surface portion on said unit formed with an upwardly extended cavity to loosely receive said upright member therein such that said side opening is in the plane of said surface portion, a conduit having a milk passage therein for communication with said side opening, and means engageable with said conduit for clamping an end face of said conduit against said surface portion and the one side of said upright member to frictionally clamp said upright member within said cavity to releasably connect said cover and power unit.

3. A milking machine comprising a milk pail cover, a power unit supported on said cover and having an upright surface portion formed with an upright groove therein, an upright milk passage member attached to and extended upwardly from said cover so as to be slidably received within said groove with an upright face of said passage member lying in the plane of said surface portion, a flexible conduit having an end face and adapted for connection to said power unit, and means engageable with said conduit for releasably clamping said end face of said conduit in fluid sealed engagement against said surface portion so that said passage member is frictionally retained between said end face and the side wall of said groove.

ELMER B. THOMPSON.

References Cited in the file of this patent
UNITED STATES PATENTS

| Number | Name | Date |
|---|---|---|
| 2,290,239 | Hodsdon | July 21, 1942 |
| 2,548,078 | Thompson | Apr. 10, 1951 |